A. E. JOHNSON.
DOUGHNUT CUTTER.
APPLICATION FILED NOV. 17, 1920.

1,380,560.

Patented June 7, 1921.

INVENTOR.
A. E. Johnson
BY
Adam E. Fisher
ATTORNEY.

UNITED STATES PATENT OFFICE.

ALFRED E. JOHNSON, OF RACINE, WISCONSIN.

DOUGHNUT-CUTTER.

1,380,560.  Specification of Letters Patent.  Patented June 7, 1921.

Application filed November 17, 1920. Serial No. 424,593.

*To all whom it may concern:*

Be it known that I, ALFRED E. JOHNSON, a citizen of the United States, residing in the city of Racine, county of Racine, and State of Wisconsin, have invented new and useful Improvements in Doughnut-Cutters, of which the following is a specification, reference being had to the accompanying drawings.

This invention is in the way of a doughnut cutter, and the object is to provide a simple and efficient cutter for the general purpose of cutting doughnuts, and having in addition a positive means for ejecting the center dough from the hole after the latter is cut.

The drawings show in—

Figure 1:
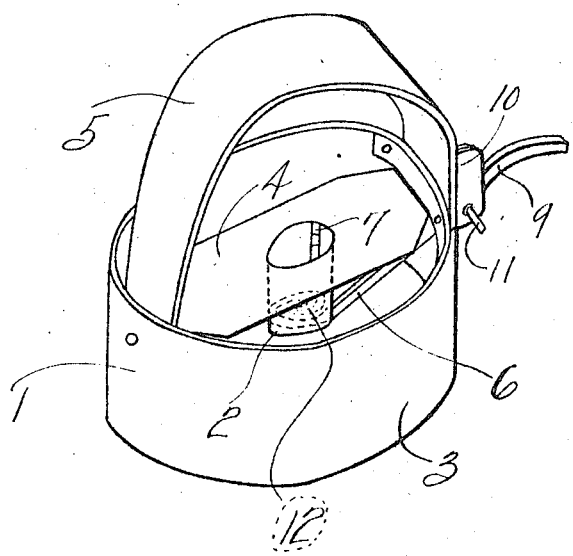
Figure 2:
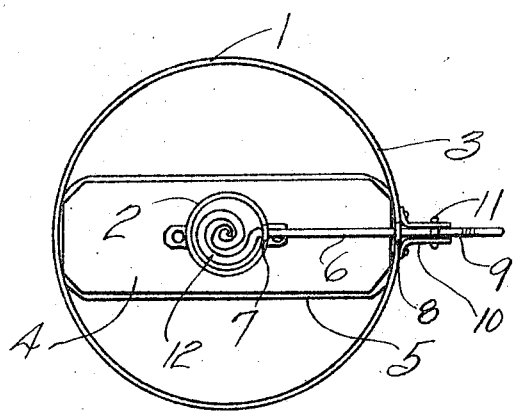
Figure 3:
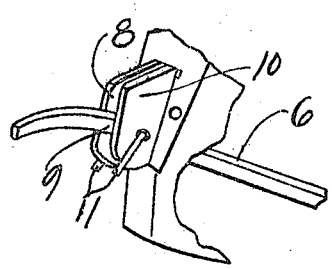

Figure 1 a perspective view;

Fig. 2 a bottom plan view;

Fig. 3 a detail of the ejecting trigger for ejecting the center dough.

The invention consists, in the combination with the ordinary cutter 1, with circular inner and outer blades 2 and 3 respectively, supported in relative position by the cross piece 4, and having a handle 5; of an ejecting trigger 6 set through alined slots 7 and 8, which are cut vertically through the walls of said inner and outer blades. The trigger is pivoted near its outer end 9 to a bracket 10 on the outer wall of the blade 3 by a pivot pin 11. The inner end of the trigger 6 is formed into a circular ejector 12 adapted to play loosely up and down inside the inner blade 2.

In use the center dough is readily thrown out from the inner blade 2 by merely manipulating the ejecting end 9 of the trigger 6.

While I have herein described a certain specific manner and method of constructing and assembling the elements of my invention it is understood that I may vary from the same in minor details, not departing from the spirit of my invention, so as best to construct a practical device for the purpose intended, as defined in the appended claims.

I claim:

1. In combination with a doughnut cutter having circular inner and outer blades, an ejecting trigger extended loosely outwardly through the walls of said blades, as means for ejecting the center dough from the inner blade.

2. A doughnut cutter comprising circular inner and outer blades and handle; and an ejecting trigger loosely extended through vertical slots in the walls of said blades, outwardly to one side and pivoted for reciprocating motion.

3. In a doughnut cutter embodying inner and outer circular blades; vertical and alined slots cut through the walls of the blades; and an ejecting trigger pivotally mounted through said slots with the inner end disposed within the inner blade and the outer end extended outside the outer blade.

ALFRED E. JOHNSON.

Witnesses:
BEN LOPER,
REINHOLD LEIDICK.